U. G. WORRALL.
GLASS AND CUP WASHING APPARATUS.
APPLICATION FILED MAY 9, 1910.
974,944.
Patented Nov. 8, 1910.
4 SHEETS—SHEET 1.
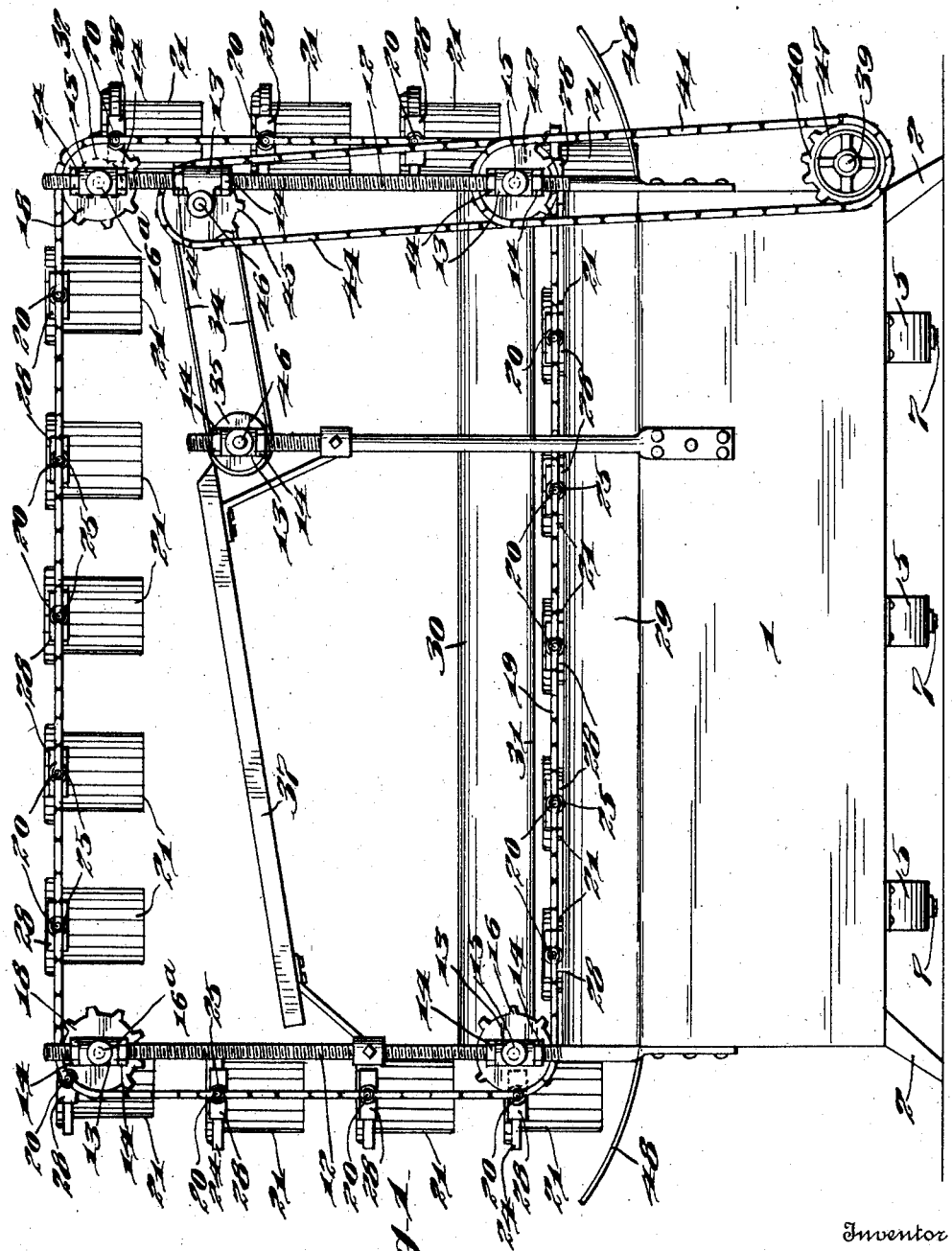
Witnesses
Inventor
Ulysses G. Worrall,
By Joshua R. H. Potts
Attorney

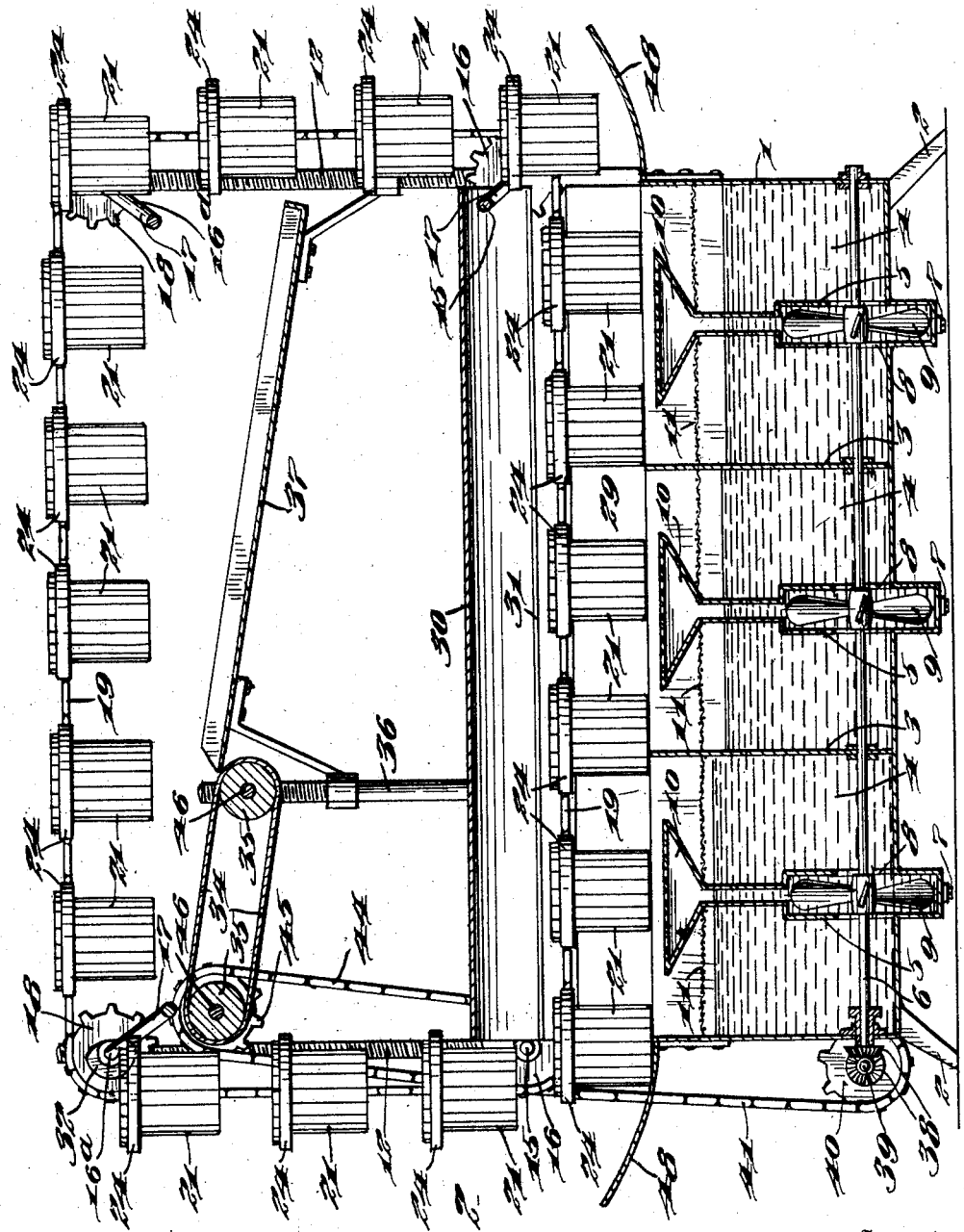

U. G. WORRALL.
GLASS AND CUP WASHING APPARATUS.
APPLICATION FILED MAY 9, 1910.
974,944.
Patented Nov. 8, 1910.
4 SHEETS—SHEET 3.
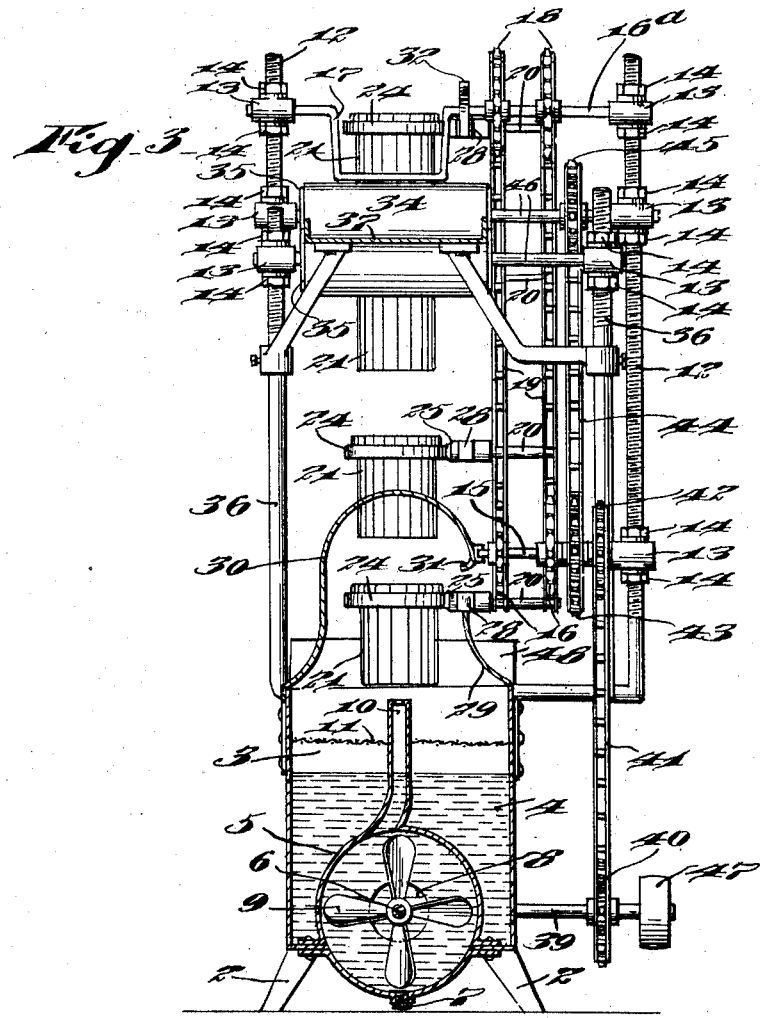
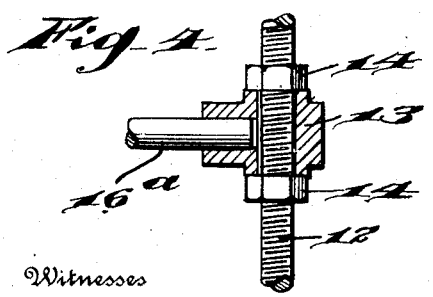
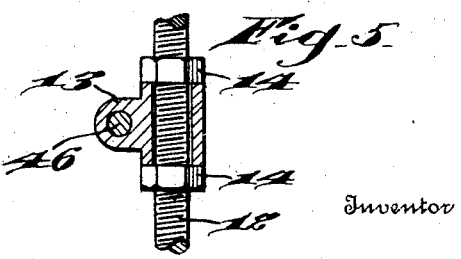
Witnesses
Inventor
Ulysses G. Worrall,
By Joshua R. H. Potts.
Attorney U. G. WORRALL.
GLASS AND CUP WASHING APPARATUS.
APPLICATION FILED MAY 9, 1910.
974,944.
Patented Nov. 8, 1910.
4 SHEETS—SHEET 4.
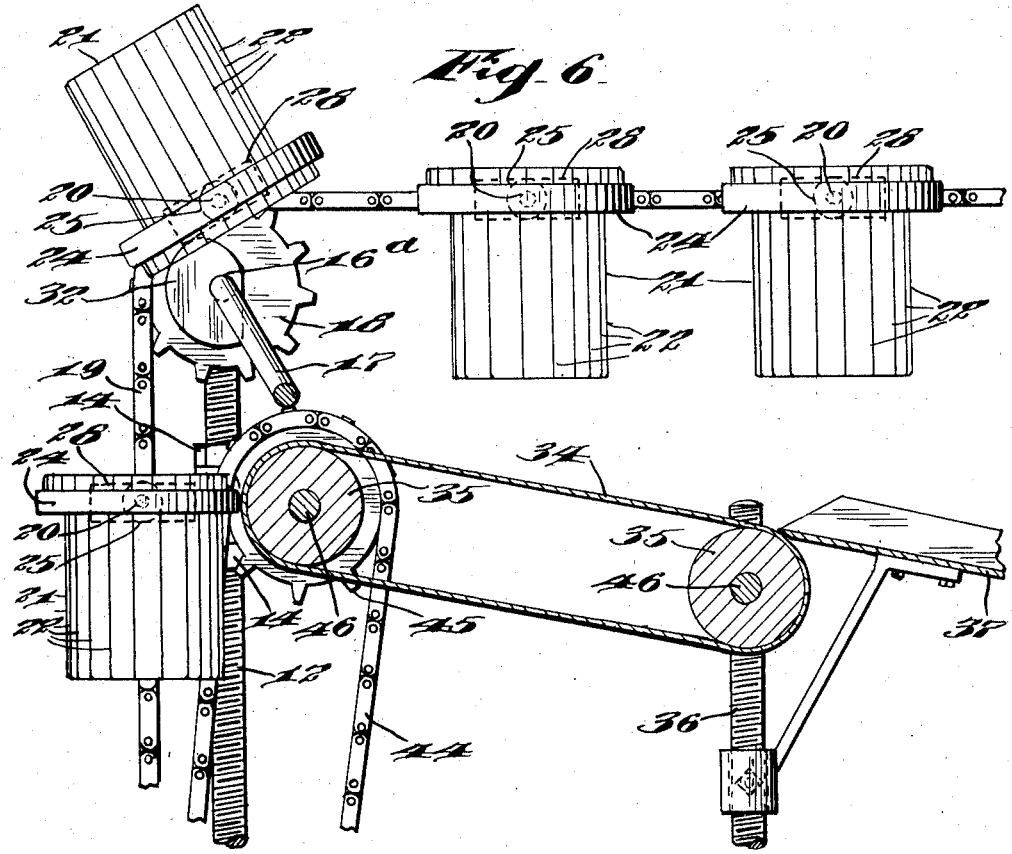
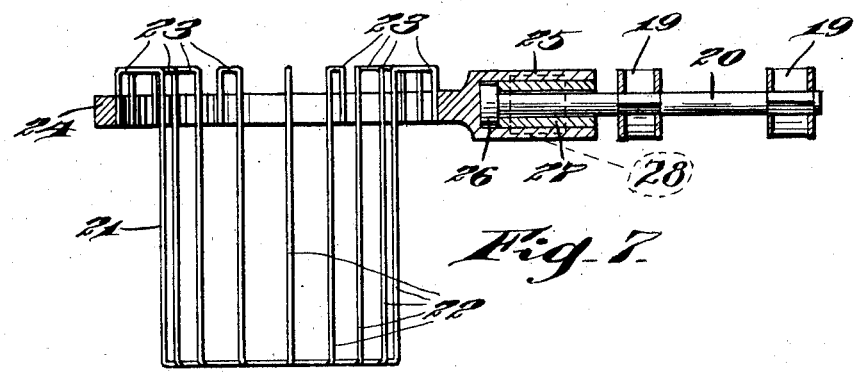
Witnesses
Inventor
Ulysses G. Worrall,
By Joshua R. H. Potts.
Attorney
THE NORRIS PETERS CO., WASHINGTON, D. C.

UNITED STATES PATENT OFFICE.

ULYSSES G. WORRALL, OF PHILADELPHIA, PENNSYLVANIA.

GLASS AND CUP WASHING APPARATUS.

974,944.  Specification of Letters Patent.  Patented Nov. 8, 1910.

Application filed May 9, 1910. Serial No. 560,230.

*To all whom it may concern:*

Be it known that I, ULYSSES G. WORRALL, a citizen of the United States, residing at Philadelphia, in the county of Philadelphia and State of Pennsylvania, have invented certain new and useful Improvements in Glass and Cup Washing Apparatus, of which the following is a specification.

My invention relates to improvements in glass and cup washing apparatus, the object of the invention being to provide an improved endless conveyer carrying a series of cup or glass receiving wire baskets adapted to be moved over a plurality of nozzles, and provide improved means for forcing liquid through said nozzles into contact with the glasses or cups in the baskets to thoroughly cleanse and sterilize them.

A further object is to provide an improved apparatus of this character with improved means for forcing the liquid through the nozzles into contact with the glasses or cups.

A further object is to provide an improved tank through which the endless conveyer moves and which is so constructed as to compel all liquid thrown up by the nozzles to fall back into the tank.

A further object is to provide an improved construction of basket which is designed particularly for receiving glasses and cups, and provide improved means for mounting the said baskets on the endless conveyer and provide improved means for tilting the baskets to eject the glasses and cups onto a suitable apron which directs onto an inclined tray from which they may be removed as they accumulate.

With these and other objects in view, the invention consists in certain novel features of construction and combinations and arrangements of parts, as will be more fully hereinafter described and pointed out in the claims.

In the accompanying drawings: Figure 1 is a view in elevation illustrating my improvements. Fig. 2 is a view in longitudinal section. Fig. 3 is a view in cross section. Figs. 4 and 5 are detail views of shaft hangers. Fig. 6 is an enlarged view illustrating the basket discharging mechanism, and Fig. 7 is an enlarged view in longitudinal section of one of the baskets and its mounting.

1, represents an elongated tank supported on suitable feet 2, and divided by partitions 3 into a plurality of compartments 4. In each compartment a circular propeller casing 5 is located, and these propeller casings project below the bottom of tank 1, and are provided with plugged outlets 7 to drain them. A shaft 6 extends longitudinally through all of the compartments and through inlet openings 8 in the casings 5, and on this shaft 6 in the several casings, rotary propellers 9 are located and are adapted when revolved, to force the water up through nozzles 10. These nozzles are somewhat elongated as shown, and perforated in their upper faces so as to discharge a plurality of small streams of the water, and they project through horizontal screens 11 in the upper portion of each chamber, and said screens prevent broken glass, china, and other larger particles from falling into the compartments to interfere with the operation of the propellers.

At the corners of the tank, vertical screw-threaded rods or posts 12 are secured and support shaft hangers 13, which are adjustably secured between nuts 14 on the rods or posts. The lower pair of shaft hangers support short shafts 15, which project over the ends of the tank and support sprocket wheels 16. On the pairs of posts at both ends of the tank adjacent the upper ends thereof, the hangers 13 support shafts 16ª. These shafts are bowed as illustrated at 17, for a purpose which will more fully hereinafter appear. Two sprocket wheels 18 are supported on shafts 16ª, and two endless sprocket chains 19 are passed around the several sprocket wheels 15 and 18, as illustrated. These sprocket chains 19 are connected at regular intervals by short shafts 20, which are fixed to the links and carry at their free ends baskets 21, as will now be explained. Each basket comprises a plurality of wires 22 bent into substantially U-shape, secured together at their central lower ends and having their upper ends bent outward and downward as illustrated at 23, where they are secured to a ring 24. This bend 23 in the wires allows a cup to be inserted in the basket with the handle of the cup projecting between the wires. Ring 24 is integral with a sleeve 25, which is positioned on the shaft 20, and receives the enlarged head 26 on the end of the shaft, which is confined in the sleeve by means of an internal tube 27 driven thereinto. By means of this mounting, the baskets are free to swing on the shafts while the shafts are held against turning with relation to the chains. The sleeves 25 are provided at opposite sides with lugs 28, which when the baskets are moved from the tank ride upon the upper edge of an inwardly projecting sheet or plate 29, which constitutes a part of the tank cover. The main part of the tank cover illustrated at 30 bows as illustrated in Fig. 3, and at its free edge bends inwardly as shown at 31, so that the water on the inner face of the top will be directed back into the tank and not outside of the tank.

On one of the rods or shafts 16ª, a cam 32 is fixed and this cam lies in the path of movement of the lugs 28, so that as the lugs engage the cam, the baskets are tilted as shown in Fig. 6, so as to dump the glass or cup upon an endless apron 34. This apron 34 is mounted on drums 35, supported on suitable posts 36 and constructed to convey the glasses and cups upon an inclined tray 37, as illustrated.

While, of course, the several chains and the several shafts may be driven in various ways, I prefer to drive them as follows: Shaft 6 is connected by beveled gears 38, with a cross shaft 39, on which a sprocket wheel 40 is secured. This sprocket wheel 40 is connected by a chain 41, with a sprocket wheel 42 on one of the shafts 15. In fact, this shaft 15 on which sprocket wheel 42 is secured is the only one of the shafts which turn, the other shafts being fixed and the sprocket wheels turn thereon. A sprocket wheel 43, on the said shaft 15, is connected by a chain 44 with a sprocket wheel 45 on a shaft 46, driving one of the drums 35, so as to transmit motion to the apron 34. A drive pulley 47 is secured on shaft 39, and is adapted to be connected by a belt (not shown) with any suitable source of power.

The operation is as follows: The operator stands at one end of the apparatus and places the dirty glasses and cups in the baskets as they pass, placing the cups and glasses upside down in the baskets. The conveyer then carries the baskets through the tank, over the several nozzles, and as the shaft 6 revolves, the propellers force the water up through the nozzles, through the baskets into contact with the glasses and cups, the water being deflected back into the receptacle by the cover 30. In the several compartments 4, different waters are provided so that the glasses are subjected to three different fluids to thoroughly cleanse and sterilize them, the water in the last chamber being preferably clear and very hot, so that the articles quickly dry. As the baskets with the washed glasses and cups reach the cam 32, they will be caused to tilt as illustrated in Fig. 6, so that the glasses and cups will drop down upon apron 34, and be directed onto the tray 37 from which they may be removed as they accumulate.

After passing the cam 32, the baskets swing in normal position, ready to receive other articles to be washed. To catch any drip from the baskets and the articles, inclined drains 48 are provided at the ends of the tank below the vertical columns of baskets.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a tank, a nozzle in the tank, a pump in the tank constructed to force liquid through the nozzle and direct it upwardly, a conveyer movable over the nozzle, baskets pivotally mounted on said conveyer and adapted to be passed across the path of discharge from said nozzle, and means holding said baskets against pivotal movement in their passage over the nozzle, substantially as described.

2. In an apparatus of the character described, the combination with a tank, nozzles in the tank, pumps forcing liquid upwardly through the nozzles, an endless conveyer movable over the nozzles, baskets pivotally supported on the conveyer, and means adapted to move along the upper edge of the tank and hold the baskets against pivotal movement in their passage over the nozzles, substantially as described.

3. In an apparatus of the character described, the combination with a tank to contain cleansing fluid, a nozzle projecting upwardly in said tank, a rotary propeller submerged in the liquid in the tank and constructed to force the fluid upward through said nozzle, endless chains, shafts on said chains, baskets pivotally supported on said shafts and adapted to be moved across the path of discharge from said nozzle, and means holding said baskets against pivotal movement in their passage over the nozzle, and means for driving said propeller and moving said chains, substantially as described.

4. In an apparatus of the character described, the combination with a tank to contain cleansing fluid, a nozzle projecting upwardly in said tank, a rotary propeller submerged in the liquid in the tank and constructed to force the fluid upward through said nozzle, endless chains, shafts on said chains, baskets pivotally supported on said shafts and adapted to be moved across the path of discharge from said nozzle, and means holding said baskets against pivotal movement in their passage over the nozzle, an endless apron, means for moving the apron, and means for tilting the baskets to discharge their contents onto the apron, substantially as described.

5. In an apparatus of the character described, the combination with a tank to contain cleansing fluid, a nozzle projecting upwardly in said tank, a rotary propeller submerged in the liquid in the tank and constructed to force the fluid upward through said nozzle, endless chains, shafts on said chains, baskets pivotally supported on said shafts and adapted to be moved across the path of discharge from said nozzle, lugs fixed to move with the baskets, and moved along the edge of the tank preventing pivotal movement of the baskets, a fixed cam in the path of movement of the lugs whereby the baskets are tilted, and mechanism constructed to receive the articles from the baskets when they are tilted, substantially as described.

6. In an apparatus of the character described, the combination with a tank to contain cleansing fluid, a nozzle projecting upwardly in said tank, a rotary propeller submerged in the liquid in the tank and constructed to force the liquid upward through said nozzle, endless chains, shafts on said chains, baskets pivotally supported on said shafts and adapted to be moved across the path of discharge from said nozzle, and means holding said baskets against pivotal movement in their passage over the nozzle, means for tilting the baskets to discharge the articles therefrom, an endless apron constructed to receive the articles discharged from the baskets, a tray onto which the apron directs the articles, and means for driving the propeller, the chains, and the apron, substantially as described.

7. In an apparatus of the character described, the combination with an elongated tank, and partitions dividing said tank into a plurality of compartments, of upwardly projecting nozzles in said compartments, rotary propellers submerged in the liquid in said compartments constructed to force the fluid in the compartments and upward through the nozzles, a shaft common to all of said propellers and projecting through the tank, an endless conveyer, baskets pivotally secured on said conveyer constructed to be moved across the path of discharge from said nozzles, and means holding said baskets against pivotal movement in their passage over the nozzle, a cover over said tank constructed to direct fluid back into the tank, and screens in the upper portions of each of said compartments, substantially as described.

8. In an apparatus of the character described, the combination with an elongated tank, and partitions dividing said tank into a plurality of compartments, of upwardly projecting nozzles in said compartments, propellers in said compartments constructed to force the fluid in the compartments upward through the nozzles, a shaft common to all of said propellers and projecting through the tank, screw-threaded posts on the corners of said tank, shaft hangers adjustably secured on said posts, shafts in said hangers, sprocket wheels on said shafts, sprocket chains on said wheels, short shafts secured to said chains, and baskets pivotally mounted on said shafts and adapted to be moved across the path of discharge of said nozzles, substantially as described.

9. In an apparatus of the character described, the combination with an elongated tank, and partitions dividing said tank into a plurality of compartments, of upwardly projecting nozzles in said compartments, propellers in said compartments constructed to force the fluid in the compartments upward through the nozzles, a shaft common to all of said propellers and projecting through the tank, an endless conveyer, a plurality of baskets carried by said conveyer across the path of discharge from the nozzles, each basket comprising a plurality of U-shaped wires having their ends bent outward and downward, and a ring secured to the free ends of said wires and constituting a part of the basket, substantially as described.

In testimnoy whereof I have signed my name to this specification in the presence of two subscribing witnesses.

ULYSSES G. WORRALL.

Witnesses:
R. H. KRENKEL,
C. E. POTTS.